US008631785B2

(12) United States Patent
Marzahn et al.

(10) Patent No.: US 8,631,785 B2
(45) Date of Patent: Jan. 21, 2014

(54) METHOD FOR DETECTING DEVIATIONS OF INJECTION QUANTITIES AND FOR CORRECTING THE INJECTION QUANTITY, AND INJECTION SYSTEM

(75) Inventors: Gabriel Marzahn, Regensburg (DE); Janos Radeczky, Wenzenbach (DE)

(73) Assignee: Continental Automotive GmbH, Hannover (DE)

( * ) Notice: Subject to any disclaimer, the term of this patent is extended or adjusted under 35 U.S.C. 154(b) by 270 days.

(21) Appl. No.: 12/996,086

(22) PCT Filed: Apr. 29, 2009

(86) PCT No.: PCT/EP2009/055192
§ 371 (c)(1),
(2), (4) Date: Dec. 3, 2010

(87) PCT Pub. No.: WO2009/149987
PCT Pub. Date: Dec. 17, 2009

(65) Prior Publication Data
US 2011/0079199 A1    Apr. 7, 2011

(30) Foreign Application Priority Data

Jun. 10, 2008    (DE) .......................... 10 2008 027 516

(51) Int. Cl.
*F02D 41/34* (2006.01)
(52) U.S. Cl.
USPC .......................................... 123/478; 123/299
(58) Field of Classification Search
USPC ......... 123/446, 447, 472, 478, 480, 490, 502, 123/299, 300; 701/102–105, 114; 73/114.45
See application file for complete search history.

(56) References Cited

U.S. PATENT DOCUMENTS

| 4,372,266 | A  | * | 2/1983  | Hiyama et al. | 123/357 |
| 5,161,510 | A  |   | 11/1992 | Yamada        | 123/494 |
| 5,845,624 | A  | * | 12/1998 | Ajima         | 123/494 |
| 6,557,530 | B1 | * | 5/2003  | Benson et al. | 123/480 |
| 6,823,834 | B2 | * | 11/2004 | Benson et al. | 123/299 |
| 6,847,881 | B2 |   | 1/2005  | Melbert       | 701/103 |
| 6,907,864 | B2 |   | 6/2005  | Takemoto      | 123/478 |
| 6,990,855 | B2 | * | 1/2006  | Tuken et al.  | 73/114.51 |

(Continued)

FOREIGN PATENT DOCUMENTS

| DE | 19930309 A1 | 1/2001  | ............. F02D 41/38 |
| DE | 10024662 A1 | 12/2001 | ............. F02M 47/06 |

(Continued)

OTHER PUBLICATIONS

International Search Report and Written Opinion for Application No. PCT/EP2009/055192 (16 pages), Aug. 24, 2009.

(Continued)

*Primary Examiner* — John T. Kwon
*Assistant Examiner* — Johnny Hoang
(74) *Attorney, Agent, or Firm* — King & Spalding L.L.P.

(57) ABSTRACT

A method provides for detecting deviations of injection quantities for injections into internal combustion engines, as carried out for example by common-rail systems. At least one deviation of at least one injection quantity is detected by determining at least one deviation, from a predefined value in each case, of at least one value of at least one variable controlling an actuator of the injector and/or indicating at least one state of the actuator.

15 Claims, 2 Drawing Sheets

(56) References Cited

U.S. PATENT DOCUMENTS

| | | | |
|---|---|---|---|
| 7,319,930 B2 * | 1/2008 | Dietl et al. | 701/104 |
| 7,422,005 B2 * | 9/2008 | Hardy et al. | 123/490 |
| 7,456,545 B2 | 11/2008 | Huber et al. | 310/316.03 |
| 7,576,473 B2 * | 8/2009 | Berlemont et al. | 310/316.03 |
| 7,856,963 B2 * | 12/2010 | Hopley et al. | 123/472 |
| 2005/0022793 A1 | 2/2005 | Takemoto | 123/480 |
| 2005/0252494 A1 * | 11/2005 | Rauznitz et al. | 123/498 |
| 2006/0157019 A1 * | 7/2006 | Dietl et al. | 123/299 |
| 2007/0079811 A1 * | 4/2007 | Nakane | 123/478 |
| 2007/0182280 A1 | 8/2007 | Huber et al. | 310/316.03 |
| 2008/0072879 A1 * | 3/2008 | Nagase et al. | 123/494 |
| 2008/0116855 A1 * | 5/2008 | Augesky et al. | 320/166 |
| 2009/0063016 A1 * | 3/2009 | Nakata et al. | 701/103 |
| 2009/0090333 A1 * | 4/2009 | Spadafora et al. | 123/494 |
| 2009/0254263 A1 * | 10/2009 | Shimizu | 701/104 |
| 2010/0036588 A1 | 2/2010 | Marzahn | 701/104 |

FOREIGN PATENT DOCUMENTS

| | | | |
|---|---|---|---|
| DE | 10143502 C1 | 3/2003 | F02D 41/20 |
| DE | 10337875 | 4/2004 | F02D 41/38 |
| DE | 10337875 A1 | 4/2004 | F02D 41/04 |
| DE | 102004052690 | 6/2006 | F02D 41/20 |
| DE | 102004052690 A1 | 6/2006 | F02D 41/20 |
| DE | 102007008201 | 8/2008 | F02D 41/20 |
| EP | 1167729 | 1/2002 | F02D 41/20 |
| EP | 1167729 A1 | 1/2002 | F02D 41/20 |
| EP | 1860312 | 11/2007 | F02D 41/20 |
| WO | 2005/026516 A1 | 3/2005 | F02D 41/20 |
| WO | 2005026516 | 3/2005 | F02D 41/20 |
| WO | 2009149987 | 12/2009 | F02D 41/20 |

OTHER PUBLICATIONS

German Office Action, German Patent application No. 10 2008 027 516.6-26, 2 pages, Nov. 12, 2008.

* cited by examiner

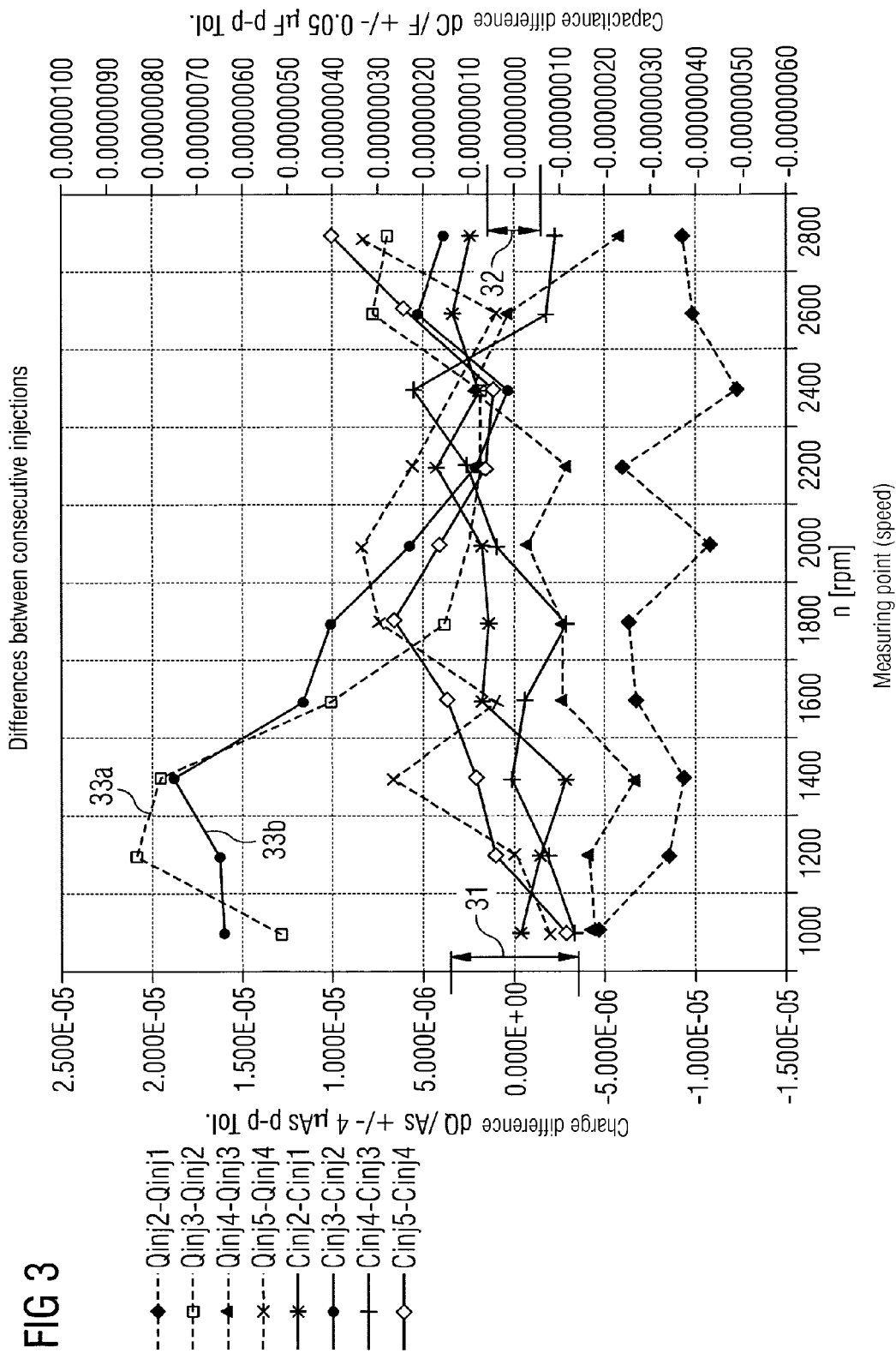

METHOD FOR DETECTING DEVIATIONS OF INJECTION QUANTITIES AND FOR CORRECTING THE INJECTION QUANTITY, AND INJECTION SYSTEM

CROSS-REFERENCE TO RELATED APPLICATIONS

This application is a U.S. National Stage Application of International Application No. PCT/EP2009/055192 filed Apr. 29, 2009, which designates the United States of America, and claims priority to German Application No. 10 2008 027 516.6 filed Jun. 10, 2008, the contents of which are hereby incorporated by reference in their entirety.

TECHNICAL FIELD

The present invention relates to a method for detecting deviations in injection quantities for injections into internal combustion engines, as carried out by common rail systems, for example. The invention also relates to a method for correcting injection quantities in such a system and to an injection system with which at least one of the two methods can be implemented.

BACKGROUND

In an injector, as used e.g. in common rail systems, fuel injection into a combustion chamber of a cylinder of an internal combustion engine is controlled by an actuator. Such actuators can be implemented, for example, as stacks of piezoelectric crystals.

Injection can be controlled by allowing fuel to flow from a high-pressure region of the injector to a low-pressure region of the injector, e.g. via a control valve. The resultant pressure differences enable a nozzle of the injector to be opened so that fuel is injected into a combustion chamber. Such control of the opening and closing of the nozzle may take place by the actuator causing the spray hole or holes to open and/or close only indirectly, via pressure differences.

The problem now is that if, for example, a valve is opened between the high- and low-pressure region in order to bring about the pressure change necessary for opening the nozzle or more specifically a spray hole, pressure waves can propagate in the high-pressure region and/or in the low-pressure region. In addition, numerous other effects can influence the setting and change of the pressures in the high- and low-pressure region. In particular, even in the low-pressure region, uncontrolled and unpredictable gas inclusions may be present or be caused by pressure fluctuations which affect the pressure conditions. Such pressure changes can retroact on the valve, the actuator and other components involved in injection control.

Uncontrolled pressure conditions in the high-pressure region and/or in the low-pressure region affect the injection quantity, as the action of the actuator is transmitted by means of pressure changes via the fuel in the high- and/or in the low-pressure region to the mechanism which opens and closes the spray holes or nozzles for injection. Therefore, unless the pressure conditions are the same and precisely known for each injection, a given activation of the actuator will result in different injection quantities depending on the pressure conditions in the high- and/or low-pressure region. Of particular relevance here is the fact that, for a given activation of the actuator, different pressure conditions may result in different speeds and durations of opening of the spray holes or nozzles.

SUMMARY

According to various embodiments, a method can be specified whereby an injection quantity deviation can be detected. According to other embodiments, a method can be specified whereby, if a deviation is present, the injection quantity can be corrected. According to yet other embodiments, an injection system can be specified with which the above methods can be implemented.

According to an embodiment, in a method for detecting injection quantity deviations in injectors, at least one deviation of at least one injection quantity is detected by determining at least one deviation, from a predefined value in each case, of at least one value of at least one variable controlling an actuator of the injector and/or indicating at least one state of the actuator.

According to a further embodiment, by means of the at least one deviation, at least one pressure fluctuation in at least one low-pressure region and/or at least one high-pressure region of the injector can be determined and therefore the deviation of the injection quantity is detected. According to a further embodiment, the at least one actuator can be a piezoelectric actuator or an electromagnetic actuator. According to a further embodiment, the at least one variable may comprise a voltage across the actuator and/or a current flowing into or through the actuator and/or at least one charge that has flowed into the actuator and/or at least one energy that has flowed into the actuator and/or at least one capacitance of the actuator. According to a further embodiment, the predefined value can be a value of the corresponding variable for a preceding injection, preferably the immediately preceding injection, preferably in a same phase of the injection. According to a further embodiment, the deviation between a value of the variable for the first injection of a multiple injection and a subsequent injection, in particular the second injection, of the same multiple injection can be determined. According to a further embodiment, the at least one value for determining the deviation or at least one of the deviations can be determined immediately after the end of a charging phase in which the actuator is charged, wherein immediately after the charging phase a charge that has flowed into the actuator during the charging phase and/or the actuator capacitance determined from the charge and a voltage present at the actuator is preferably measured as the at least one value. According to a further embodiment, a deviation in a force acting on the actuator at the end of the charging phase can be inferred from the measured capacitance and/or a deviation in a force acting on the actuator during the charging phase is inferred from the measured charge. According to a further embodiment, the at least one value for determining the deviation or at least one of the deviations can be measured during a charging phase and/or during a holding phase and/or at the end of a holding phase and/or during a discharging phase and/or after a discharging phase of the actuator. According to a further embodiment, the values of the variable or of at least one of the variables can be measured in a plurality of measurements and/or during a plurality of time instants during the charging phase and/or the holding phase and/or the discharging phase, wherein the variable or at least one of the variables are measured in a burst measurement comprising a plurality of measurements. According to a further embodiment, an earlier or later and/or slower or faster opening of an injection valve of the injector can be determined from the determined deviation or from at least one of the deviations. According to a further embodiment, at least one of the values of the at least one variable can be measured at an input and/or at an output of an actuator output stage controlling the actuator.

According to another embodiment, in a method for correcting injection quantities, a deviation in at least one injection quantity can be detected by a method as described above and the injection quantity can be corrected by correcting at least one value controlling the actuator such that the at least one deviation of a value controlling the actuator of the injector and/or indicating at least one state of the actuator is reduced, minimized or eliminated.

According to a further embodiment of the method, by correcting the at least one value controlling the actuator, a holding phase and/or a discharging phase of the actuator can be lengthened or shortened and/or at least one injection valve can be closed earlier or later. According to a further embodiment of the method, the injector can be an injector of a common rail system, preferably a piezoelectric common rail system, with particular preference a second generation piezoelectric common rail system. According to a further embodiment of the method, the actuator can be controlled by an actuator output stage which has load reaction and/or which is clocked and/or which operates as a charge source and/or as an energy source, wherein the actuator stage is preferably a CC Evo driver.

According to yet another embodiment, an injection system may comprise at least one injector which has at least one actuator, wherein the injection system is equipped to detect and/or correct a deviation of an injection quantity injected by the at least one injector by one of the methods as described above.

BRIEF DESCRIPTION OF THE DRAWINGS

An exemplary embodiment will now be explained with reference to the accompanying drawings in which.

FIG. 2 schematically illustrates a control valve unit between a high-pressure region and a low-pressure region in the piezoelectric injector and FIG. 3 shows charge and capacitance differences for consecutive injections performed by said piezoelectric injector.

DETAILED DESCRIPTION

Figure 1:
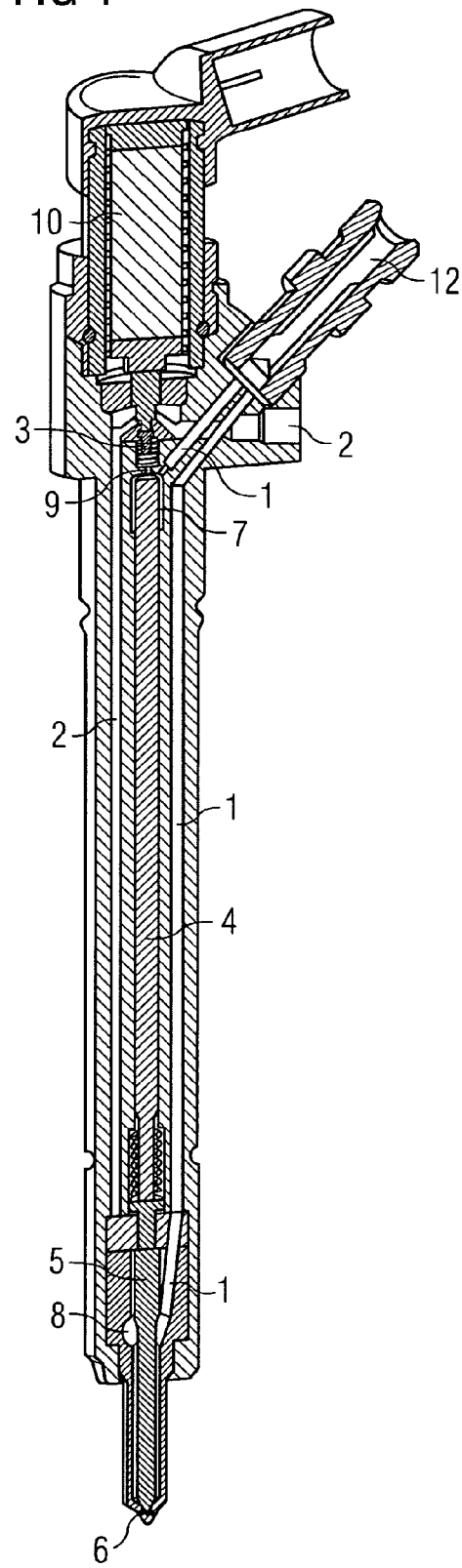
FIG. 1 shows a piezoelectric injector as used in common rail systems.

According to various embodiments, at least one deviation of at least one injection quantity is detected by determining at least one deviation of at least one value of at least one variable from a predefined value and/or from a setpoint value, wherein the variable controls at least one actuator of an injector and/or indicates at least one state of at least one actuator. That is to say, if the actuator encounters different conditions in the high- and/or low-pressure region during an injection, it is counteracted by different forces so that it executes different movements. If, for example, the pressure in the low-pressure region is high, the pressure causes the actuator to be acted upon by a higher force which is superimposed on the force exerted by the actuator to produce a resultant force. The injection quantity depends on the resultant force. If said resultant force deviates from its intended value because of pressure conditions at variance with intended conditions, the injection quantity is also at variance with its intended value. It is now possible to utilize the fact that the forces exerted on the actuator due to pressures in the high- and/or low-pressure region have an effect on the state of the actuator and, as a result, retroact on variables with which the actuator is controlled and/or which indicate the state of the actuator.

Possible actuators are, in particular, electromagnetic actuators and piezoelectric actuators. As they can be more precisely monitored and controlled, piezoelectric actuators are preferred. In their case, effects due to different pressure conditions are particularly clearly detectable.

Possible variables which are measured and for which the deviations are determined are, in particular, at least one voltage applied to the actuator, at least one current flowing into or through the actuator, charge that has flowed into the actuator, energy that has flowed into the actuator, and the actuator's capacitance. In the event that the actuator is a piezoelectric actuator, the voltage across the actuator, the current into the actuator, the charge that has flowed into the actuator, the energy that has flowed into the actuator and the actuator capacitance are preferred variables.

If the actuator is subject to an additional force caused by pressure fluctuations in the high-pressure region or in the low-pressure region, this additional force causes an additional voltage to develop between the actuator's inputs which is superimposed on any voltage applied.

Particularly if the actuator is a piezoelectric actuator, the capacitance of the actuator also changes with respect to a reference state if a deviating or additional force is exerted thereon due to the pressure conditions, thereby causing the charge and/or energy flowing into the actuator to change with respect to a reference state. Measuring these variables therefore gives an indication of the force exerted and/or its deviation from a setpoint value due to the pressure conditions in the high-pressure region and/or in the low-pressure region. The presence of such a deviation can then indicate a deviation in the injection quantity.

A large number of the problems caused by uncontrolled pressure conditions occur primarily in the case of multiple injections. Particularly due to the rapid succession of a plurality of injections, in the second and following injections effects may occur which change the pressure conditions. However, especially with multiple injections it is important that the individual injections of the multiple injections are in the correct relationship to one another. To detect deviations in the injection quantities, it is therefore preferable to determine the deviations in the values of the corresponding variables between two injections. Here, the value of the variable for a first injection of the multiple injection is the predefined value or the reference value (setpoint value).

It is preferable, in the case of multiple injections, to determine the difference between the first injection of the multiple injection and a subsequent injection of the same multiple injection. It is particularly preferable if, to determine the deviation of a second injection of a multiple injection, the difference between the values of this injection and those of the first injection are determined, and if, in a third injection of a multiple injection, the difference between the values of this injection and the values of the second injection are determined. The same preferably applies to any subsequent injections.

The method is implementable in a corresponding manner for single injections. Here values of an individual injection can be compared with corresponding values of a subsequent individual injection, e.g. in subsequent cycles of the same cylinder.

Normally the activity of a piezoelectric actuator during an injection can be subdivided into three phases. First, charge is loaded into the actuator in a charging phase. The charging phase is followed by a holding phase in which the actuator essentially does not change. The actuator is then discharged in a discharging phase.

The charge loaded into the actuator is related to the capacitance C of the actuator and the voltage U applied to the actuator via the relation $C(t)=Q(t)/U(t)$. A deviation in the pressure conditions in the high-pressure region and/or in the low-pressure region of the injector may result in a change in the capacitance C of the actuator. The capacitance of the actuator is then a suitable variable for determining changed pressure conditions, i.e. deviations in forces acting on the actuator, and therefore different activity of the actuator, because, due to the piezoelectric effect, there is a relationship between the force exerted on the actuator and the capacitance. Said capacitance can be determined using the charge and voltage relationship stated at the beginning of this paragraph by measuring the charge and the voltage, the charge in turn being typically determined by measuring the current flowing into the actuator and by integrating said current.

However, the capacitance of the actuator is not necessarily determinable in each phase or at each point in time or is not determined in each phase in many injection systems. For example, it can be provided that the capacitance is determined by charge and voltage measurement only for a point in time at the end of a charging phase of the piezoelectric actuator, i.e. at the end of a valve stroke. From the determined capacitance, only the pressure or force conditions obtaining at that point in time can be inferred. However, in this case, measurement of the charge flowing or having flowed into the actuator permits the pressure or force conditions that obtained during the charging phase to be inferred, because changes—not measured in this case—in the capacitance during the charging phase affect the charge actually flowing into the actuator because of a so-called driver effect. As stated, the charge is preferably determined by integration, e.g. by hardware integration, of the piezoelectric current. Consequently it is possible, by means of a single point measurement, i.e. by determining the charge and voltage at a single point in time during an injection process, to infer both deviations in pressure conditions during the charging phase and deviations during the holding phase following the charging phase. This in turn enables a deviation of an actual injection quantity from a reference injection quantity to be detected. Alternatively, instead of the charge, the value of the measured voltage could also be used to infer the conditions during the charging phase for a given capacitance.

A particular advantage of the methods according to various embodiments is that they can be used in second generation piezo common rail systems (PCR2), where only a single point measurement of the charge Q and the voltage U is carried out as standard. In said second generation piezo common rail system, this measurement takes place at the start of the holding phase. Even this single measurement enables, among other things, particular effects on the actuator to be determined in the cases described below.

On the one hand, an additional counterforce on the actuator may occur during the charging phase. As described above, such a counterforce may be caused, for example, by different pressure conditions in the high-pressure and/or low-pressure region. If this additional force is no longer present at the end of the charging phase, any effect on the capacitance C cannot be determined in a measurement carried out immediately after the charging phase at the start of the holding phase. This because the capacitance only deviates from its setpoint value as long as an additional force is actually being exerted on the actuator.

On the other hand, however, a disturbance during the charging phase can be determined on the basis of the charge Q. The charge Q can be determined e.g. in the PCR2 system, as described above, by integration of the current flowing into the piezoelectric actuator during the charging phase. If the capacitance of the actuator changes during the charging phase due to an additional application of force, at the end of the charging phase the charge loaded into the actuator is different from what it would have been without this additional application of force because of the already mentioned driver effect—i.e. a reaction of the capacitance of the actuator on the driver which controls the actuator. In existing PCR2 systems, even an actual force, disturbance or deviation occurring as early as the charging phase can therefore be detected with the method according to various embodiments.

Another case which can be detected by capacitance measurement at the start of the holding phase, e.g. in a PCR2 system, is a disturbance present at the start of the holding phase, i.e. during said measurement itself. As the disturbing influence is present specifically during the capacitance measurement, the effect on the capacitance is clearly measurable. An effect on the charge, on the other hand, is normally not present, as charging current generally no longer flows during the holding phase.

Disturbances occurring after the start of the holding phase, i.e. at a later point in the holding phase or in the discharging phase, cannot be determined using a single measurement at the start of the holding phase. It is therefore preferable, alternatively or in addition to the measurements or the measurement at the start of the holding phase, if measurements during the charging phase, measurements at a later point in time of the holding phase or even measurements during or after the discharging phase are carried out. If the complexity, in particular the computational complexity involved, is to be kept within bounds, it is possible to carry out only a small number of measurements which are suitably distributed over the duration of the injection, the advantageous distribution of the measuring points depending on the specifics of the injection system, particularly the duration of fuel flows through particular constrictions and the manner in which gas bubbles can occur in the fuel. Also the propagation times of pressure waves within the high- and low-pressure regions affect the appropriate placement of measuring points.

Particularly precise determination of the deviation of the variable controlling the actuator and/or indicating a state of the actuator and therefore also particularly accurate correction of the injection quantities can be achieved if the number of measurements during an injection is as large as possible. It is therefore also particularly preferable that the variables are available as burst measurements, i.e. continuous or quasi-continuous over time, thereby permitting time-dependent detection of the deviations.

As described, to detect deviations it is preferable to determine the difference between the values of the variables and the values of the variables in preceding injections. It is preferable here that, in both injections, values which were obtained at corresponding points in time during the respective injection are interrelated. In this way it can be determined whether in the present injection the system is in the same state as in the earlier reference injection at the corresponding point in time, i.e. in a same phase.

According to other embodiments, in a method for correcting the injection quantity, preferably a deviation of the injection quantity is detected in the above described method and then at least one variable controlling the actuator is changed such that the deviation of at least one value of at least one variable controlling the actuator and/or indicating at least one state of the actuator is reduced, minimized or eliminated. The method for correcting the injection quantity can also be carried out such that only the deviation of the actuator from its setpoint state is determined or that additionally or alternatively the deviation of at least one of the measured variables from its setpoint value, i.e. from the corresponding value of a previous injection, is determined, and the actuator or rather the corresponding variable is corrected by a controller such that the effect of additional or deviating forces on the actuator or rather the variable is compensated. In addition, instead of the injection quantity, a variable correlated with the injection quantity and/or the deviation in the injected quantity can also be determined and/or corrected whose relationship to the injection quantity or to the deviation in the injection quantity is known.

The injection quantity can be corrected in various ways. As described above, the actuator can be controlled differently using one of the variables mentioned. It is thus possible, for example, to apply a different voltage and/or to change the charge and/or energy flowing into the actuator. In addition, it is also possible to lengthen or shorten the opening time or the injection time in order to compensate an excessively high or excessively low injection quantity due to a disturbance. An excessively high injection quantity can be compensated, for example, by reducing the injection time, and an excessively low injection quantity by increasing the injection time. The lengthening or shortening of the injection time can take place in the charging phase, the holding phase and/or the discharging phase. It is preferably corrected during the holding phase.

It is particularly advantageous and therefore preferable to measure the values of the variables for determining deviations at the input and/or at the output of an actuator output stage by which the actuator or actuators are controlled. In this case the method can be carried out particularly advantageously if the actuator output stage does not automatically compensate changes in the corresponding variable. Pulsed output stages, charge-source-like sources such as e.g. a CC Evo driver are therefore preferably used as the actuator output stage. Energy-source-like sources are also possible as the actuator output stage. When using piezoelectric actuators, piezo power output stages can be used.

FIG. 1 shows an injector with piezoelectric actuator, also known as a piezoelectric injector, as used in common rail systems. The various embodiments described here can be used in an injection system having injectors of this kind.

The mode of operation of such an injector will now be briefly described. However, instead of the described injector, other injectors can also be used which have, for example, a conventional electromagnetic actuator instead of the piezoelectric actuator.

In the injector, a high-pressure region 1 is coupled to a high-pressure region of the common rail system via a high-pressure port 12. The high-pressure region 1 is separated from the injector's low-pressure region 2 and associated low-pressure port by a control valve 3. The injector also has a control plunger 4 which is connected at one end to a nozzle needle 5 which blocks or clears a spray hole 6 or a nozzle 6. Fuel can be injected through the spray hole 6 or nozzle 6 into a combustion chamber of an internal combustion engine.

In the closed state, the nozzle needle 5 is pressed against the spray hole by the following mechanism. The control plunger 4 and the nozzle needle 5 are connected to the high-pressure region 1 of the injector, the side of the control plunger 4 facing away from the nozzle needle 5 ending in a control chamber 7 where it is surrounded by fuel at high pressure. On the other side, the nozzle needle 5 adjoins a high-pressure chamber 8 in which fuel is likewise present at high pressure. Viewed in the movement direction, the surface with which the control plunger 4 is in contact with the high-pressure fuel in the control chamber 7 is larger than the surface, acting in the movement direction, with which the nozzle needle 5 is in contact with fuel at high pressure in the high-pressure chamber 8. As a result, the control plunger 4 and the nozzle needle 5 are normally pressed onto the spray hole 6 in the direction of the nozzle needle 5.

The control valve 3 which separates the high-pressure region 1 from the low-pressure region 2 is disposed above an outlet restrictor 9 connected to the control chamber 7. The control valve 3 can be opened and closed by an actuator 10 implemented here as a piezoelectric actuator. If the control valve 3 is now opened by the actuator 10, fuel flows from the high-pressure region 1 through the outlet restrictor 9 out of the control chamber 7 into the low-pressure region 2. As a result, the fuel pressure on the control plunger 4 in the control chamber 7 falls so that the force exerted on the control plunger 4 in the control chamber 7 is less than the force exerted on the nozzle needle 5 in the high-pressure chamber 8. This causes the control plunger 4 and the nozzle needle 5 to be forced away from the spray hole 6 in the direction of the control valve 3 so that the latter opens. As an alternative to a piezoelectric actuator, the actuator can also be an electromagnetic actuator.

Figure 2:
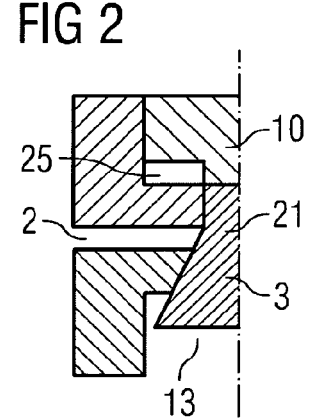

FIG. 2 schematically illustrates the control valve 3 which is connected to the actuator 10 via a valve plunger 21. If the actuator 10 expands due to the application of a voltage, it pushes the valve plunger 21 and the control valve 3 downward so that a passage from a highly pressurized valve chamber 13 connected to the control chamber 7 to the low-pressure region 2 opens and fuel flows from the high-pressure region 1 (not shown in FIG. 2) via the valve chamber 13 into the low-pressure region 2. The space 25 in front of the actuator 10, which borders an actuator diaphragm disposed at the bottom end of the actuator 10, is connected to the low-pressure region 2 in a manner allowing the passage of fuel. Therefore, if the control valve 3 opens, the fuel flows very rapidly from the control chamber 7 into the low-pressure region 2. On the one hand, gas bubbles may be present in the low-pressure region 2 which alter the outflow behavior of the fuel from the control chamber 7 into the low-pressure region. In addition, however, the rapid outflow of the fuel may also cause pressure waves both in the high-pressure region 1 and in the low-pressure region 2 which can be reflected inside the system and retroact on the actuator 10. Moreover, gas bubbles may also occur directly in front of the actuator diaphragm in the region 25, resulting in a change in a counterforce acting on the actuator 10. Said force acting on the actuator 10 therefore depends particularly on whether the space 25 is filled with gas or liquid, because when the actuator is moved, a medium present there must be moved through gaps (not visible in FIG. 2) between the valve plunger 21 and adjacent parts of the injector. These effects result in deviations in an injection quantity from a setpoint injection quantity, the detection and correction of which is the subject matter of the method described here.

FIG. 3 shows differences in the charge that has flowed into an actuator 10 between two consecutive injections (dashed lines) and differences in capacitances during two consecutive injections (continuous lines). Said differences are obtained by measurements in a PCR2 system at the start of the holding phase, i.e. in the same phase for each injection, immediately after the end of a charging phase, the charges being determined by integration over a current, measured for that purpose, through the actuator 10 and the capacitances being obtained therefrom as a function of a likewise measured voltage present at the actuator 10. The differences shown are therefore obtained by single point measurements carried out as standard in PCR2 systems.

During operation of an internal combustion engine to which the present invention relates, five individual injections are carried out consecutively at the start of a power stroke of each cylinder in a multiple injection, the differences as shown in FIG. 3 being calculated in each case for two injections adjacent in time. The values of the charge differences of two consecutive injections are plotted on the left-hand vertical axis, while the capacitance differences are plotted on the right-hand vertical axis. The results for the charge difference measurement are subject to the inaccuracy 31, whereas the capacitance differences are subject to the inaccuracy 32. Plotted along the horizontal access is the engine speed at which the respective measurement was carried out. In an alternative embodiment, the difference between the measured variable and the corresponding variable for the individual injection then serving as a reference variable could also be determined and used.

The curves 33a and 33b show the charge and capacitance difference respectively between the second and third injection of the multiple injection. The charges are here denoted by empty squares, the capacitances by filled circles. For these differences, a correlation between the charge difference and the capacitance difference is particularly noticeable. It should be noted that here the respective value for the third injection is greater than the corresponding value for the second injection, resulting in a positive difference. Said correlation may be inferred from the fact that a deviation in a force acting on the actuator 10 compared to the earlier injection has occurred, namely such that even at the end of the charging phase, i.e. during the single point measurement performed at the start of the holding phase, other forces than for the reference injection are present and have assumed other values because of their capacitance and charge. Other configurations are conceivable, in particular the case that during the single point measurement the capacitance has an unchanged value and only the charge shows a deviation compared to the reference injection. This indicates changed force or pressure conditions during the charging phase, whereas an unchanged pressure compared to the reference injection obtains in the holding phase. Conversely, it is also conceivable that the charge difference disappears or has a negligible value, whereas the measured capacitance is at variance with the preceding injection. This suggests—after normal force conditions during the charging phase—changed force or pressure conditions during the holding phase.

FIG. 3 also shows in detail, by means of filled diamond shapes, the charge difference between second and first injection, by means of filled triangles the difference between fourth and third injection and by means of crosses the charge difference between fifth and fourth injection of the multiple injection. Asterisks are used to indicate the capacitance difference between second and first injection, vertical lines the capacitance difference between fourth and third measurement and horizontal bars the capacitance difference between fifth and fourth injection.

An injection quantity deviation can now be detected on the basis of the differences shown. Here the capacitance and the charge can be regarded as a variable indicating the state of the actuator or as a variable controlling the actuator, as the case may be. As can be seen from FIG. 3, the values of these variables are at variance with one another in successive measurements, which is an indication of the presence of an injection quantity deviation. Such a deviation may already arise due to different setpoint quantities for the individual injections. In addition, however, a deviation of this kind may be caused by a disturbance such as a pressure fluctuation in the low-pressure region or in the high-pressure region. Such disturbance-induced deviations between actual injection quantity and setpoint injection quantity are now detected by comparing the measuring points actually recorded during operation of the internal combustion engine with in each case a setpoint value predetermined on an operating-state-dependent basis. A deviation from the setpoint value determined in this way indicates a deviation in the injection quantity which can then be corrected by varying activation times of the actuator 10 such that the deviation of the measuring points from the corresponding setpoint values are minimized and preferably caused to disappear.

Further measured variables recorded during operation of the internal combustion engine for the same purpose can be, for example, a voltage across the actuator, a current flowing through the actuator, a charge that has flowed into the actuator and/or energy that has flowed into the actuator. Alternatively or in addition, measuring points used in a similar way for detecting and if necessary correcting a deviation between actual injection quantity and setpoint injection quantity can also be set during the charging phase, during the holding phase, at the end of the holding phase, during the discharging phase and/or after the end of a discharging phase of an individual injection. Also a large number of measurements, particularly burst measurements, can be carried out. The measurements can be taken, for example, at an input and/or output of an actuator output stage controlling the actuator. Such an output stage can be, for example, a CC Evo driver. The output stage preferably has a load reaction and/or is clocked. It can operate e.g. as a charge source or as an energy source.

In addition, an earlier or later and/or slower or faster opening of the injection valve of the injector can be determined from the deviations detected.

If an injection quantity deviation is detected in the manner described, the injection quantity can therefore be corrected by correcting at least one value controlling the actuator 10 in such a way that the deviation of a value of a variable controlling the actuator 10 and/or indicating the state of the actuator 10 is reduced, minimized or eliminated. In particular, an injection valve can also be closed or opened earlier or later.

The invention claimed is:

1. A method for detecting injection quantity deviations in injectors, comprising:
    monitoring a series of injections performed by a particular injector, each injection in the series of injections having a corresponding cycle time;
    measuring a first value of a variable associated with an actuator of the injector at a particular point in time during the cycle time of a first injection of the series of injections, wherein the variable controls the actuator or indicates a state of the actuator;
    measuring a second value of the variable at a point in time during the cycle time of a second injection of the series of injections, wherein the point in time is equivalent to the particular point in time during the cycle time of the first injection;
    comparing the first value with the second value to determine a deviation of the second value from the first value, and
    calculating a deviation of an injection quantity between the first injection and the second injection based at least in part on the determined deviation of the second value from the first value.

2. The method according to claim 1, wherein determining a deviation of an injection quantity based on the determined deviation of the second value from the first value comprises:
    determining a pressure fluctuation in at least one of a low-pressure region and a high-pressure region of the injector based on the determined deviation of the second value from the first value, and detecting the deviation of the injection quantity based on the determined pressure fluctuation.

3. The method according to claim 1, wherein the actuator is a piezoelectric actuator or an electromagnetic actuator.

4. The method according to claim 1, wherein the variable comprises at least one of a voltage across the actuator, a current flowing into or through the actuator, at least one charge that has flowed into the actuator, at least one energy that has flowed into the actuator, and at least one capacitance of the actuator.

5. The method according to claim 1, wherein the first injection and the second injections comprise successive single injections of one multiple injection by the particular injector.

6. The method according to claim 1, wherein the particular point in time of the first injection and the equivalent point in time of the second injection are immediately after the end of a charging phase in which the actuator is charged, wherein immediately after the charging phase at least one of a charge that has flowed into the actuator during the charging phase and the actuator capacitance determined from the charge and a voltage present at the actuator is measured as the corresponding value.

7. The method according to claim 6, wherein a deviation in a force acting on the actuator at the end of the charging phase is inferred from the measured capacitance and a deviation in a force acting on the actuator during the charging phase is inferred from the measured charge.

8. The method according to claim 1, wherein the particular point in time occurs during a charging phase, during a holding phase, at the end of a holding phase, during a discharging phase, or after a discharging phase of the actuator.

9. The method according to claim 1, wherein the first and second values of the variable are measured in a plurality of measurements, during a plurality of time instants during the charging phase, the holding phase, and the discharging phase, and wherein the first and second values of the variable are measured in a burst measurement comprising a plurality of measurements.

10. The method according to claim 1, wherein the first and second instantaneous values of the variable are measured at an input or an output of an actuator output stage controlling the actuator.

11. A method for correcting injection quantities, comprising
monitoring a series of injections performed by a particular injector, each injection in the series of injections having a corresponding time cycle;
measuring a first value of a variable associated with an actuator of the injector at a particular point during the time cycle of a first injection of the series of injections, wherein the variable controls the actuator or indicates a state of the actuator;
measuring a second value of the variable at a point in time during the time cycle of a second injection of the series of injections, wherein the point in time is equivalent to the particular point in time during the time cycle of the first injection;
comparing the first value to the second value to determine a deviation of the second value from the first value,
calculating a deviation of an injection quantity between the first injection and the second injection based at least in part on the determined deviation of the second value from the first value; and
adjusting the injection quantity for at least one subsequent injection by adjusting at least one value of a variable controlling the actuator such that the deviation of the injection quantity for the at least one subsequent injection is reduced.

12. The method according to claim 11, wherein adjusting the at least one value controlling the actuator comprises at least one of:
(a) causing an earlier, later, slower, or faster opening of a fuel injection valve,
(b) lengthening or shortening at least one of a holding phase and a discharging phase of the actuator, and
(c) closing the injector earlier or later.

13. The method according to claim 11, wherein the injector is an injector of a common rail system or a piezoelectric common rail system.

14. The method according to claim 11, wherein the actuator is controlled by an actuator output stage which at least one of: has load reaction, is clocked, and operates as at least one of a charge source and as an energy source.

15. An injection system comprising:
at least one injector which has at least one actuator, and
a control system operable to:
monitor a series of injections performed by a particular injector, each injection in the series of injections having a corresponding time cycle;
measure a first value of a variable associated with an actuator of the injector at a particular point in time during the time cycle of a first injection of the series of injections, wherein the variable controls the actuator or indicates a state of the actuator;
measure a second value of the variable at a point in time during the time cycle of a second injection of the series of injections, wherein the point in time is equivalent to the particular point in time during the time cycle of the first injection;
compare the first value to the second value to determine a deviation of the second value from the first value, and
calculate a deviation of an injection quantity between the first injection and the second injection based at least in part on the determined deviation of the second value from the first value;
adjust the injection quantity for subsequent injections by the particular injector by adjusting at least parameter of the actuator of the injector such that injection quantity deviations during the subsequent injections are reduced.

* * * * *